United States Patent [19]

Chang et al.

[11] Patent Number: 5,077,562

[45] Date of Patent: Dec. 31, 1991

[54] DIGITAL BEAM-FORMING TECHNIQUE USING TEMPORARY NOISE INJECTION

[75] Inventors: Donald C. Chang, Thousand Oaks; Kar W. Yung, Torrance; Joseph G. Gurley; Urban A. Van Der Embse, both of Los Angeles, all of Calif.

[73] Assignee: Hughes Aircraft Company, Los Angeles, Calif.

[21] Appl. No.: 632,846

[22] Filed: Dec. 24, 1990

[51] Int. Cl.[5] ........................ H01Q 3/22; G01S 13/00; G01S 3/16

[52] U.S. Cl. .................................... 342/368; 342/195; 342/383

[58] Field of Search ............... 342/194, 195, 368, 382, 342/383

[56] References Cited

U.S. PATENT DOCUMENTS

| | | | |
|---|---|---|---|
| 4,804,963 | 2/1989 | Clapham | 342/195 |
| 5,005,419 | 4/1991 | O'Donnell et al. | 73/626 |

OTHER PUBLICATIONS

Ruvin et al., "Digital Multiple Beamforming Techniques for Radar," Conf. EASCON, 1978, 25–27 Sep. 1978.

*Primary Examiner*—Gregory C. Issing
*Attorney, Agent, or Firm*—Gordon R. Lindeen, III; Steven M. Mitchell; Wanda K. Denson-Low

[57] ABSTRACT

An efficient digital beam-forming network (100) utilizing a relatively few small-scale A/D converters is disclosed herein. The inventive beam-forming network (100) is disposed to generate an output beam B in response to a set of N input signals. The set of input signals is provided by an antenna array (110) having N elements, upon which is incident an electromagnetic wavefront of a first carrier frequency. The present invention includes an orthogonal encoder circuit (170) for generating a set of N orthogonal voltage waveforms. A set of biphase modulators (162–168) modulates the phase of each of the input signals in response to one of the orthogonal voltage waveforms, thereby generating a set of N phase modulated input signals. The N phase modulated input signals are combined within an adder (180) to form a composite input signal. The inventive network (100) further includes a downconverting mixer (184) for generating an IF input signal in response to the composite input signal. The IF input signal is then separated into baseband in-phase and quadrature-phase components by an I/Q split network 192. A pair of A/D converters (198, 200) then sample the in-phase and quadrature-phase components of the input signal. A decoder (202), coupled to the orthogonal encoder circuit (170), provides decoded digitial in-phase signals and decoded digital quadrature phase signals in response to the digital in-phase and quadrature-phase signals. The present invention further includes a digital beam-former (130) for generating the output beam B by utilizing the decoded in-phase and quadrature-phase signals.

17 Claims, 2 Drawing Sheets

DIGITAL BEAM-FORMING TECHNIQUE USING TEMPORARY NOISE INJECTION

BACKGROUND OF THE INVENTION

1. Field of the Invention

This invention relates to beam-forming networks used in conjunction with antenna arrays. More specifically, this invention relates to digital beam-forming networks.

While the present invention is described herein with reference to a particular embodiment, it is understood that the invention is not limited thereto. Those having ordinary skill in the art and access to the teachings provided herein will recognize additional embodiments within the scope thereof.

2. Description of the Related Art

Prior to advances in digital technology, beam-forming in response to a wavefront incident on a radar or communications antenna array was performed in the analog domain. In analog beam-forming systems, signals are manipulated in radio frequency (RF) microwave networks or at an intermediate frequency (IF) in the receiver. Efficient analog beam-forming schemes utilized a Butler or a Bliss network. While offering improvements over earlier analog beam-formers, the performance of these more efficient analog networks were nonetheless plagued by resistive losses, critical tolerances, and lack of multiplexing capability. In light of these limitations, efforts have been made to develop digital approaches.

In digital beam-forming systems, operations are performed on digitized baseband in-phase (I) and quadrature-phase (Q) signals within special-purpose digital processors in order to form the beams. Certain radar and communications antennas using digital beam-forming techniques require beam-forming networks with a wide dynamic range in order to maintain accuracy in the face of signal clutter or intentional jamming. This minimum dynamic range requirement currently necessitates the utilization of analog-to-digital (A/D) converters typically having at least seven bits of resolution. Moreover, many conventional digital beam-forming systems employ separate A/D converters to process the I and Q signals associated with each element in the receive array.

Such large-scale use of A/D converters increases the power requirements, weight and complexity of the network. For satellite applications, reductions in the magnitude of each of these parameters is tantamount to an optimal design. Hence, a need exists in the art for a digital beam-forming network employing a minimal number of A/D converters, ideally with each converter being of a minimal bit size.

SUMMARY OF THE INVENTION

The need in the art for a more efficient digital beam-forming apparatus utilizing few, small-scale, A/D converters is addressed by the improved digital beam-forming network of the present invention. The inventive network is disposed to generate an output beam in response to a set of N input signals. The set of input signals is provided by an antenna array having N elements, upon which is incident an electromagnetic wavefront of a first carrier frequency. In a most general sense, the invention includes circuitry for limiting the dynamic range of the input signals. The range limited input signals are then digitized and used to form an output beam in a conventional manner.

In a specific embodiment, the present invention includes an orthogonal encoder circuit for generating a set of N orthogonal voltage waveforms. A set of bi-phase modulators modulates the phase of each of the input signals in response to one of the orthogonal voltage waveforms, thereby generating a set of N phase modulated input signals. The N phase modulated input signals are combined within an adder to form a composite input signal. The inventive network further includes a downconverting mixer for generating an IF input signal in response to the composite input signal.

The IF input signal is then separated into baseband in-phase and quadrature-phase components by an I/Q split network. A pair of A/D converters then sample the in-phase and quadrature-phase components of the input signal. A decoder, coupled to the orthogonal encoder circuit, provides decoded digital in-phase signals and decoded digital quadrature phase signals in response to the digital in-phase and quadrature-phase signals. The present invention further includes a digital beam-former for generating the output beam by utilizing the decoded in-phase and quadrature-phase signals.

DETAILED DESCRIPTION OF THE INVENTION

Figure 1:
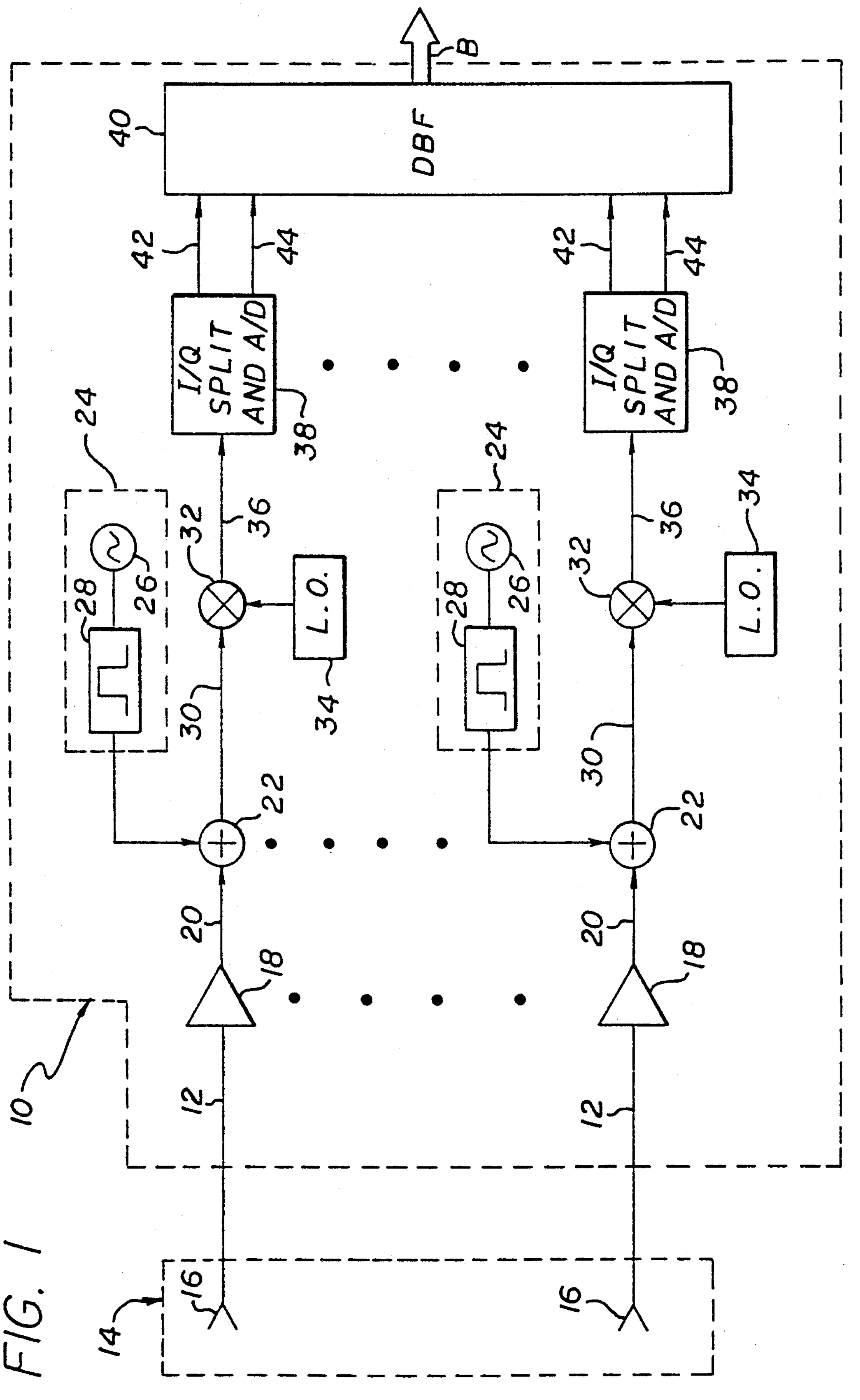
FIG. 1 is a block diagrammatic representation of a simplified embodiment of the digital beam-forming network of the present invention.

FIG. 1 is a block diagrammatic representation of a simplified embodiment of the digital beam-forming network 10 of the present invention. The beam-forming network 10 accepts a set of M input signals on M input signal lines 12 from a receive antenna array 14 having M elements 16. The input signals on the lines 12 are generated by electromagnetic wavefronts incident on the receive array 14 and share a common high frequency carrier (e.g. microwave). The inventive network 10 is disposed to generate one or more electromagnetic beams B in response to the high frequency input signals impressed on the lines 12. The beam B may then be routed to, for example, a digital processing network (not shown).

As noted in the Background of the Invention, A/D converters employed in conventional beam-forming networks require a relatively large number of bits as a result of the dynamic range of the signals processed thereby. The necessary dynamic range is determined on the basis of the power level difference between the strongest anticipated communication or jamming signal and the thermal noise floor. Specifically, a 40 dB dynamic range requires an A/D converter having approximately 7 to 8 bits. As discussed more fully below, the inventive beam-forming network 10 is operative to inject band-limited noise into the high frequency input signals originating within the array 14 in order to raise the noise floor and thus decrease the dynamic range necessary in the analog to digital conversion process. This engineered decrease in dynamic range enables A/D converters within the network 10 to function using fewer bits, which reduces power requirements, cost, and complexity. In certain instances the inventive beam-forming network 10 may require A/D converters having as few as one to three bits. The injected noise is substantially precluded from becoming aliased into the signal band during the analog-to-digital conversion process by sampling at a sufficiently high rate.

The digital beam-forming network 10 includes a set of M low-noise amplifiers 18, with each amplifier 18 being coupled to an array element 16 by a signal line 12. The amplifiers 18 each have passbands centered about the carrier frequency of the input signals present on the lines 12. The amplified high frequency input signals are then transmitted over a set of M amplifier output lines 20 to a set of M summation networks 22.

Each summation network 22 is addressed by an amplifier output line 20 and by one of a set of M noise sources 24. The noise sources 24 each contain a noise generator 26 and a bandpass filter 28. The passband of each filter 28 is adjusted in response to the degree to which it is desired to raise the noise floor, or equivalently, to the degree to which it is desired to reduce the apparent dynamic range spanned by the amplified input signals present on the lines 20. The summation networks 22 thus launch the amplified input signals and band-limited noise onto downconverter input lines 30.

A set of M downconverting mixers 32, each coupled to one of the lines 30, convert the set of M high frequency input signals to a set of signals centered about an intermediate frequency (IF). A set of M local oscillators 34 provide reference frequencies for the mixers 32. The IF signals are impressed on mixer output lines 36 and transmitted to a set of M conversion modules 38. Each module 38 includes circuitry for converting the IF signals into in-phase (I) and quadrature-phase (Q) baseband components. A pair of A/D converters within each conversion module 38 then digitize the I and Q components by sampling each at a predetermined rate. To prevent Nyquist-type aliasing of the injected noise into the digital frequency spectra occupied by the sampled I and Q components, the sampling rate is chosen to be at least twice the magnitude of the bandwidth of the injected noise. For example, a bandpass filter 28 defining a 1 MHz noise bandwidth would require an A/D converter executing approximately 2 Mega samples/second in order to prevent aliasing.

The sampled I and Q components are provided to a digital beam-former 40 via a pair of conversion module output lines 42 and 44. The beam-former 40 typically includes a special purpose digital processor for arithmetically manipulating the sampled I and Q components. As is well known, during each processor clock period the sampled I and Q components are processed to form one or more beams B. The beam-former 40 may also include digital band rejection filters having stopbands coincident with the passbands of the filters 28. These band rejection filters may be employed to prevent infiltration of injected noise into the beam B notwithstanding sampling in excess of the Nyquist rate.

In this manner the inventive beam-forming network 10 is operative to temporarily inject band-limited noise into signals originating in elements of a receive array, thereby reducing the number of bits required in the A/D conversion process.

Figure 2:
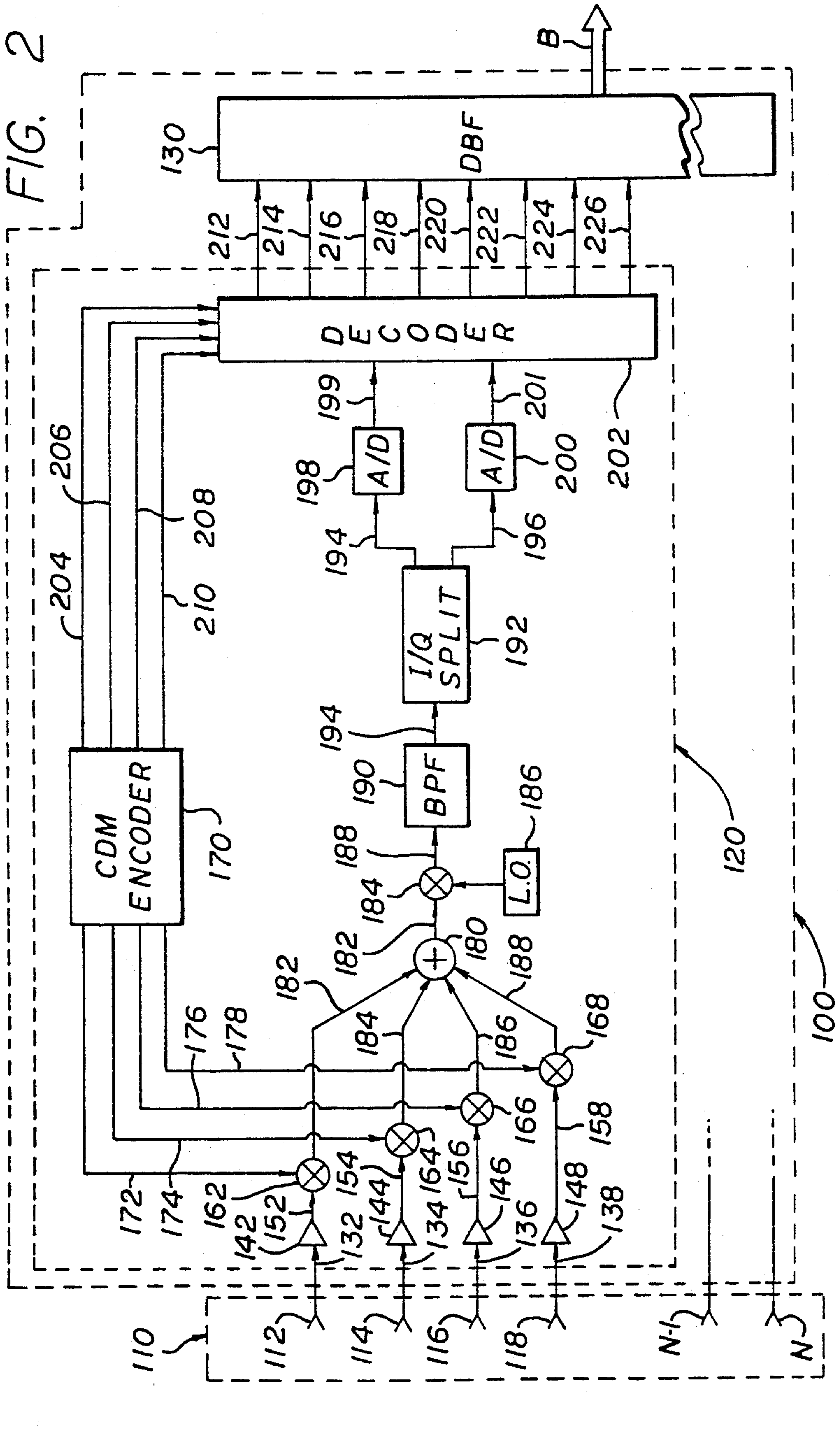
FIG. 2 is a block diagrammatic representation of a preferred embodiment of the digital beam-forming network of the present invention.

FIG. 2 is a block diagrammatic representation of a preferred embodiment of the digital beam-forming network 100 of the present invention. The network 100 is addressed by signals originating within a receive antenna array 110 under illumination by an electromagnetic wavefront. The receive array 110 includes N antenna elements. FIG. 2 explicitly shows the first, second, third and fourth elements 112, 114, 116, 118 as well as the next to last and last elements N−1, N. The first four elements 112–118 are coupled to a first beam-forming subnetwork 120. In the embodiment of FIG. 2 the inventive beam-forming network 100 includes N/4subnetworks which together feed a digital beam-former 130. It is emphasized that the teachings of the present invention extend to subnetworks coupled to substantially any number of receiver array elements and that a subnetwork 120 having only four channels was selected for purposes of clarity.

The subnetwork 120 accepts first, second, third and fourth input signals generated by the first, second, third and fourth array elements 112–118 on first, second, third and fourth input signal lines 132–138. Again, the frequency of each of the input signals is centered about a high frequency carrier (e.g. microwave) equivalent to that of the wavefront incident on the array 110. The subnetwork 120 is operative to deliver sampled in-phase (I) and quadrature-phase (Q) components associated with the first, second, third and fourth input signals to the beam-former 130. The beam-former 130 generally includes a special-purpose digital processor and is driven by sampled I/Q signals from each of the N/4 subnetworks within the inventive network 100. The beam-former conventionally synthesizes one or more beams B in response to the I/Q signals supplied thereto. The information associated with each beam may then be routed to a separate processor (not shown) for further digital processing.

As is discussed more fully below, the principle of utilizing noise injection as a means of reducing the required A/D converter dynamic range is also implemented in the preferred embodiment of FIG. 2. However, auxiliary band-limited noise sources such as those described with reference to FIG. 1 will generally not be needed in the inventive network 100 of FIG. 2. Rather, reductions in the requisite A/D dynamic range are effectuated within each subnetwork by code-division multiplexing of the four channels thereof such that the noise floor of each channel is raised by the signals present on the remaining three channels.

As shown in FIG. 2, the first, second, third and fourth input signals drive first, second, third and fourth low-noise amplifiers (LNA's) 142, 144, 146, 148. The LNA's 142–148 typically have substantially identical frequency passbands centered about the high-frequency carrier and are disposed to impress first, second, third and fourth amplified input signals on first, second, third and fourth amplifier output lines 152–158. The frequency spectra of each of the amplified input signals may be further limited by coupling a bandpass filter (not shown) to each of the LNA's.

The amplifier output lines 152–158 each feed a first port of first, second, third and fourth biphase modulators 162, 164, 166, 168. A second port of each of the biphase modulators 162–168 is coupled to a codedivision multiplexing encoder 170 via first, second, third and fourth phase control lines 172–178. The encoder 170 is operative to supply a set of four orthogonal voltage waveforms to the biphase modulators 162–168 via the four phase control lines 172–178. The encoder 170 is operative at a known clock rate and, during each clock cycle, impresses either a normalized voltage of +1 or −1 on each of the lines to the modulators 172–178. For example, the following set of orthogonal voltage square waves may be sent to the biphase modulators 162–168 over a particular four clock cycle interval:

| | | | | |
|---|---|---|---|---|
| First waveform to first modulator: | 1 | 1 | 1 | −1 |
| Second waveform to second modulator: | 1 | 1 | −1 | 1 |
| Third waveform to third modulator: | 1 | −1 | 1 | 1 |
| Fourth waveform to fourth modulator: | −1 | 1 | 1 | 1 |

A normalized voltage of +1 present on a line 172–178 induces the modulator 162–168 coupled thereto to leave intact the phase of the amplified input signal present on the associated line 152–158. Alternatively, during clock cycles of the encoder 170 wherein a −1 normalized voltage is impressed on one of the lines 172–178, the modulator 162–168 coupled thereto inverts the phase of the amplified signal present on the associated line 152–158. In this manner, the biphase modulators 162–168 impress first, second, third and fourth orthogonally phase modulated signals on biphase modulator output lines 182–188.

The encoder 170 includes a TTL square wave circuit for generating the set of orthogonal voltage waveforms transmitted by the lines 172–178. The clock rate of the encoder 170 is chosen to be at least large as the magnitude of the sum of the frequency bandwidths of the amplified input signals present on the lines 152–158. For example, if the bandwidth of each the four LNA's 142–148 (or bandpass filters coupled thereto) is 1 MHz, then the minimum acceptable clock rate of the encoder 170 is 4 MHz. The encoder 170 may be purchased off-the-shelf as a code generator.

The first, second, third and fourth orthogonally phase modulated signals are summed within a 4:1 combiner 180. The combiner 180 impresses a composite phase modulated input signal on a combiner output line 182 coupled thereto. The composite input signal is then fed to a first port of a downconverting mixer 184 coupled to the output line 182. A local oscillator 186 is connected to a second port of of the mixer 184. Since the carrier frequency of the composite input signal is known, the frequency of the local oscillator 186 is chosen such that the carrier of the composite input signal is converted to a desired intermediate frequency (IF). This composite IF signal is then sent through a bandpass filter 190 via a mixer output line 188. The passband of the filter 190 is centered about the IF frequency.

The bandpass filter 190 is coupled to an I/Q split network 192 through a filter output line 194. The I/Q split network 192 includes a pair of synchronous baseband mixers for conventionally converting the composite IF signal into in-phase (I) and quadrature-phase (Q) components. The network 192 impresses the in-phase components on a first A/D input line 194, and impresses the quadrature-phase components on a second A/D input line 196. First and second A/D converters 198, 200 connected to the lines 194, 196 then sample the I and Q components at a known sampling rate and launch the sampled I components on a first A/D output line 199 and launch the sampled Q components on a second A/D output line 201. It is observed that the subnetwork 120 included within the present invention requires only two A/D converters, whereas conventional digital beam-forming networks generally utilize a pair of A/D converters for each antenna array element.

The minimum A/D sampling rate is determined by considering the baseband signal from which the I and Q components are derived to be a set of four code-multiplexed signals, each having a noise bandwidth equivalent to the sum of the bandwidths of the input signals present on the lines 152–158. For example, if each LNA 142–148 has a bandwidth of approximately 1 MHz then each code-multiplexed baseband signal may be treated as having a bandwidth of approximately 4 MHz. Accordingly, to prevent Nyquist-type aliasing the minimum theoretically acceptable sampling rate would be 8 MHz—although in actual operation a slightly higher rate of 10 MHz would generally be utilized. The inventive network 100 is thus operative to reduce the requisite dynamic range of each of the A/D converters 198 and 200 by using three of the input signals to raise the noise floor accompanying the remaining input signal. In this manner, no external noise sources need be utilized, as in the case of the simplified embodiment of FIG. 1, in order to reduce the necessary A/D converter dynamic range.

In the embodiment of FIG. 2 the multiplexed baseband I and Q components are separated by a decoder 202 following analog to digital conversion. The decoder 202 is a finite impulse response filter used as a correlator. The decoder 202 may be implemented with a digital signal processing chip available from Analog Devices, Texas Instruments Inc., and other manufacturers. In the illustrative embodiment, the decoder 202 includes eight conventional finite impulse response (FIR) matched filters (not shown), each of which is driven by one of the orthogonal waveforms from the encoder 170. In particular, the encoder 170 impresses identical voltage waveforms on the line 172 and on a first decoder line 204, on the line 174 and on a second decoder line 206, on the line 176 and on a third decoder line 208, and on the line 178 and on a fourth decoder line 210. Each decoder line 204–210 is coupled to one of a first set of four matched filters and to one of a second set of four matched filters deployed in the decoder 202. Alternatively, the decoder 202 may digitally generate a set of orthogonal waveforms to substitute for the waveforms present on the lines 204, 206, 208 and 210.

The first A/D output line 199 is coupled to each filter within the first set of matched filters, while the second A/D output line 201 is connected to each filter within the second set of matched filters. In this manner, the sampled I components are processed by each filter within the first set of matched filters, and the sampled Q components are processed by each filter within the second set of matched filters. The matched filters coupled to the first decoder line 204 are disposed to extract the sampled I and Q components associated with the first input signal (generated by the first array element 112) by mixing therewith the first voltage waveform. Similarly, the matched filters coupled to the lines 206–210 respectively extract the sampled I and Q components associated with the input signals from the array elements 114–118. As shown in FIG. 2, the sampled I components derived from the first, second, third and fourth input signals are impressed on first, second, third, and fourth decoder output lines 212, 214, 216, and 218. Similarly, the sampled Q components derived from the first, second, third and fourth input signals are impressed on fifth, sixth, seventh, and eighth decoder output lines 220, 222, 224, and 226.

The decoder output lines 212–226 from the first subnetwork 120, along with decoder output lines from decoders included within the remaining subnetworks (not shown) of the network 100, supply the beamformer 130 with quantized baseband I and Q components of the input signals originating within the array 110. Again, the beam-former 130 includes a digital computer or special purpose processor for utilizing the sampled I and Q components supplied thereto to generate one or more beams B.

As mentioned above, the clock rate of the encoder 170 is chosen to be at least as large as the magnitude of the sum of the frequency bandwidths of the amplified input signals present on the lines 152–158. The noise floor seen by the A/D converters 198, 200 may be further raised by increasing the clock rate of the encoder 170, as this has the effect of augmenting the effective noise bandwidth. Accordingly, in operational environments wherein strong signals (jammers) are present, the encoder clock rate may be increased to dynamically raise the noise floor—thereby reducing the necessary A/D dynamic range. Reciprocal reductions in the clock rate of the encoder 170 would be appropriate in relatively jammer-free environments.

Similarly, the operational environment influences the degradation in signal-to-noise ratio (SNR) arising from reductions in the number of bits utilized in the analog to digital conversion process. For example, in an environment dominated by Gaussian noise a one bit A/D converter will generally induce approximately a 2.8 dB reduction in the SNR resulting from utilization of a six bit A/D converter. In this instance the A/D sampling rate could be correspondingly increased to maintain a constant SNR.

Thus the present invention has been described with reference to a particular embodiment in connection with a particular application. Those having ordinary skill in the art and access to the teachings of the present invention will recognize additional modifications and applications within the scope thereof. For example, the invention is not limited to subnetworks addressed by any particular number of antenna array elements. The invention is further not limited to the specific mode of orthogonally coding the phase of the input signals. Those skilled in the art may be aware of other techniques for orthogonally coding the set of input signals such that each signal may serve as a noise source for adjacent channels, and yet be separated therefrom by a decoding network. Moreover, the scope of the present invention is not constrained by the particular scheme disclosed herein for converting the set of input signals into sampled I and Q sequences. It is therefore contemplated by the appended claims to cover any and all such modifications.

Accordingly,

What is claimed is:

1. A digital beam forming network for generating an output beam in response to a set of N input signals, said set of input signals being provided by an antenna array having N elements upon which is incident an electromagnetic wavefront of a first carrier frequency, comprising:
   - an encoder for generating a set of N orthogonal voltage waveforms;
   - a biphase modulator for modulating the phase of each of said input signals in response to one of said orthogonal voltage waveforms thereby generating a set of N phase modulated input signals;
   - an adder for combining said N phase modulated input signals to form a composite input signal;
   - a downconverter for generating an IF input signal in response to said composite input signal;
   - a converter for converting said IF input signal into baseband in-phase and quadrature-phase components;
   - a digital converter for converting said in-phase and quadrature-phase components to digital in-phase and digital quadrature-phase signals;
   - a decoder, coupled to said orthogonal encoder, for providing N decoded digital quadrature phase signals in response to said digital in-phase and quadrature-phase signals; and
   - a digital beam former for generating said output beam by utilizing said decoded in-phase and quadrature-phase signals.

2. The digital beam forming network of claim 1 wherein said decoder includes a first set of N matched filters addressed by said N digital in-phase signals, and a second set of N matched filters addressed by said N quadrature-phase signals.

3. The digital beam forming network of claim 2 wherein each of said matched filters includes means for mixing one of said digital in-phase signals with one of said orthogonal voltage waveforms, and each of said second set of matched filters includes means for mixing one said digital quadrature-phase signals with one of said orthogonal voltage waveforms.

4. The digital beam forming network of claim 1 wherein said orthogonal encoder includes a square wave circuit operative at a first clock rate.

5. The digital beam forming network of claim 1 further including a set of N amplifiers for amplifying said N input signals.

6. The digital beam forming network of claim 5 further including a set of N input bandpass filters of known frequency bandwidths wherein the sum of said bandwidths is of a magnitude not larger than the magnitude of said first clock rate, and wherein each of said input filters are coupled to one of said amplifiers.

7. The digital beam forming network of claim 6 wherein said biphase modulator includes a set of N biphase modulators, one of said modulators being coupled to each of said input bandpass filters.

8. The digital beam forming network of claim 6 wherein said digital converter includes first and second analog to digital converters for sampling said in-phase and quadrature-phase components, said first and second converters being disposed to operate at a sampling rate having a magnitude of at least twice the magnitude of said sum of filter bandwidths.

9. The digital beam forming network of claim 1 wherein said downconverter includes:
   - a mixer having first, second and third ports with said first port being addressed by said composite input signal and
   - a local oscillator of a second frequency coupled to said second port of said mixer.

10. The digital beam forming network of claim 9 further including an intermediate frequency bandpass filter coupled to said third port of said mixer.

11. A technique for forming an output beam in response to a set of N input signals, said set of input signals being provided by an antenna array having N elements upon which is incident an electromagnetic wavefront of a first carrier frequency, comprising the steps of:
   - a) generating a set of N orthogonal voltage waveforms;
   - b) modulating the phase of each of said input signals in response to one of said orthogonal voltage waveforms thereby generating a set of N phase modulated input signals;

c) adding said N phase modulated input signals to form a composite input signal;

d) generating an IF input signal in response to said composite input signal;

e) converting said IF input signal into baseband in-phase and quadrature-phase components;

f) sampling said in-phase and quadrature-phase components to create N digital in-phase and N digital quadrature-phase signals;

g) multiplying each of said orthogonal voltage waveforms with one of said N digital in-phase signals and one of said N digital quadrature-phase signals in order to provide N decoded digital in-phase signals and N decoded digital quadrature phase signals; and h) generating said output beam by utilizing said decoded in-phase and quadrature-phase signals.

12. The technique of claim 11 wherein said step of generating said set of orthogonal voltages is performed at a first clock rate.

13. The technique of claim 12 further including the step of passing each of said N input signals through one of a set of N bandpass filters of known bandwidths wherein the sum of said known bandwidths is of a magnitude not larger than the magnitude of said first clock rate.

14. The technique of claim 13 wherein said step of sampling is performed at a sampling rate having a magnitude of at least twice the magnitude of said sum of filter bandwidths.

15. The technique of claim 12 further including the step of varying said first clock rate in order to vary the bandwidth of said composite input signal.

16. A digital beam forming subnetwork for driving a digital beam-former in response to a set of N input signals, said set of input signals being provided by N elements of an antenna array upon which is incident an electromagnetic wavefront of a first carrier frequency, comprising:

orthogonal encoder means for generating a set of N orthogonal voltage waveforms;

biphase modulator means for modulating the phase of each of said input signals in response to one of said orthogonal voltage waveforms thereby generating a set of N phase modulated input signals;

adder means for combining said N phase modulated input signals to form a composite input signal;

downconverter means for generating an IF input signal in response to said composite input signal;

means for converting said IF input signal into baseband in-phase and quadrature-phase components;

means for sampling said in-phase and quadrature-phase components to create digital in-phase and digital quadrature-phase signals; and decoder means, coupled to said orthogonal encoder means, for providing N decoded digital in-phase signals and N decoded digital quadrature phase signals to said digital beam-former in response to said digital in-phase and quadrature-phase signals.

17. A technique for driving a digital beam-former in response to a set of N input signals, said set of input signals being provided by N elements of an antenna array upon which is incident an electromagnetic wavefront of a first carrier frequency, comprising the steps of:

a) generating a set of N orthogonal voltage waveforms;

b) modulating the phase of each of said input signals in response to one of said orthogonal voltage waveforms thereby generating a set of N phase modulated input signals;

c) adding said N phase modulated input signals to form a composite input signal;

d) generating an IF input signal in response to said composite input signal;

e) converting said IF input signal into baseband in-phase and quadrature-phase components;

f) sampling said in-phase and quadrature-phase components to create digital in-phase and digital quadrature-phase signals; and g) multiplying each of said orthogonal voltage waveforms with one of said digital in-phase signals and one of said digital quadrature-phase signals in order to provide decoded digital in-phase signals and decoded digital quadrature phase signals to said beam-former.

* * * * *